Dec. 30, 1958  E. W. PAXTON  2,866,838
METHOD AND APPARATUS FOR PRODUCING MOLTEN SILICATES
Filed Feb. 16, 1956  3 Sheets-Sheet 1

INVENTOR.
Elisha W. Paxton.
BY
Schmieding and Fultz
ATTORNEYS

Dec. 30, 1958   E. W. PAXTON   2,866,838
METHOD AND APPARATUS FOR PRODUCING MOLTEN SILICATES
Filed Feb. 16, 1956   3 Sheets-Sheet 2

INVENTOR.
Elisha W. Paxton.
BY
Schmieding and Fultz
ATTORNEYS

Dec. 30, 1958   E. W. PAXTON   2,866,838
METHOD AND APPARATUS FOR PRODUCING MOLTEN SILICATES
Filed Feb. 16, 1956   3 Sheets-Sheet 3

INVENTOR.
Elisha W. Paxton.
BY
Schmieding and Fultz
ATTORNEYS

United States Patent Office 2,866,838
Patented Dec. 30, 1958

2,866,838

METHOD AND APPARATUS FOR PRODUCING MOLTEN SILICATES

Elisha W. Paxton, Columbus, Ohio, assignor to Stratabar Process Company, Columbus, Ohio, a partnership Application February 16, 1956, Serial No. 565,840

29 Claims. (Cl. 13—6)

This invention relates generally to improvements in the design and control of furnaces for the melting of molten silicates such as glass, said furnaces being adapted for the continuous melting of raw materials and for the continuous withdrawal of molten glass for formation into useful products, and more particularly to the type of such furnace which is characterized by the utilization of two or more basins for containing molten glass, said basins being connected by one or more subsurface conduits or passages commonly called "throats."

The usual design of such "throat-type" furnace embodies but two basins, connected by a single throat, whose upper boundary or lintel may be located at varying depths below normal glass level, and whose bottom may be above, level with or below the bottom of either basin.

The fuel firing above first of said basins serves for the high-temperature melting of the raw materials and the more or less complete removal of the resulting bubbles, called "seed," before the molten glass passes into the throat and to the second basin.

Said second basin, being less strongly heated, serves to allow said glass to cool to more nearly the temperature required for working, and to distribute lower-temperature glass to the point or points of withdrawal for forming into useful products.

For furnaces of medium to large capacity, the most common dimensions of said throat apertures and passages are 12" high and 24" wide, resulting in a cross-sectional area of 288 square inches.

Despite the very peculiar and extremely critical nature of the hydraulic flow patterns into such throats, and the fact that they strictly limit production capacities of the furnaces due to the characteristics of said hydraulic flow patterns, as explained in detail in my co-pending application Serial Number 607,194, filed August 30, 1956, the above mentioned throat size has persisted in use, partly by habit, and partly due to the size limitations imposed by the refractories available in a single piece, for use as throat lintel blocks. The above mentioned co-pending application Serial No. 607,194 is a continuation-in-part of co-pending application Serial No. 498,258, filed March 31, 1955, now abandoned, which is in turn a continuation-in-part of Serial No. 425,262, filed April 23, 1954, now abandoned.

Though long realized in a general way that such throats induced peculiar hydraulic flow patterns that resulted in the premature passage through them, at highest production rates, for any given glass and furnace-operating temperature, of glass containing an excessive number of small bubbles or seed resulting from the melting operations, no logical and satisfactory explanation of this phenomenon seems to have been arrived at and to have become generally acceptable in the industry, and no adequate remedy therefor has been devised.

As will be explained later, throat area is a critical factor in the hydraulic characteristics of the flow of molten silicates such as glass toward and through throat apertures.

Said general realization induced earlier furnace designers to provide additional throat area by utilizing two throats, instead of one, assuming that both would remain active, and that each would then pass one-half the amount of the production tonnage of molten glass.

Unfortunately, the above mentioned assumed performance failed to be realized, and it was found that little or no advantage was gained thereby.

This was because one of the two throats invariably developed a high degree of stagnation of flow therethrough, or while the other passed virtually all of the glass to satisfy the production rate of the furnace, such that the performance and production limitations of the furnace remained practically as before.

Additional evidence of said action was presented at the time of furnace repairs, when the throat lintels showed widely different conditions of erosion, one being worn about as before, and the other exhibiting very little wear.

No adequate remedy for such performance having been devised, the provision of more than one throat between any two furnace basins has long since been abandoned as futile.

The explanation of such poor performance of multiple throats is that molten glass is: (1) Only relatively slightly permeable to the wavelengths of thermal radiation which it emits, so that hot glass only slightly affects the temperature of cooler glass at relatively short distances from it. (2) Molten glass has a relatively great temperature-versus-viscosity range, so that if it loses 50 degree F. in temperature, its viscosity increase may be in the order of 40 percent of its previous value, within temperature ranges common to throat flows for ordinary soda-lime glasses, which will reduce its mobility by approximately 29 percent. (3) After entering the throat aperture, the glass is shaded from the effective radiation of the furnace flames, so that the heat supplied to and lost from the throat passage must be conveyed thereto as sensible heat in the moving stream of molten glass.

In view of the foregoing, it will now be clear that relatively slight unbalances in the heat losses from the throat passages, as related one to the other, will have the tendency to become progressive, insofar as throat flows are concerned, because each degree of temperature lost by the glass in one throat as compared with the other will relatively retard its rate of movement therethrough by increasing its viscosity and therefore will reduce the quantity of the sensible heat conveyed by said glass to its throat passage, thus still further augmenting the progress of said glass toward stagnation.

At the same time, with production output maintained, the surface level differential, or hydraulic flow head, between working and melting basins, will automatically increase to any amount necessary to cause more and progressively more of the total production tonnage to pass through the more active throat, thus progressively bringing more sensible heat thereto.

Thus it will be clear that if the above described tendencies are counteracted in an effective manner, as is achieved with the present invention, the benefits of multiple throats are for the first time realized.

The reasons for the hydraulic performance of glass furnace throats will now be explained, inasmuch as this matter has a decisive bearing upon the advisability of using multiple throats to increase furnace melting capacity.

The most outstanding feature of the hydraulic flow in such throats is the peculiarity of selective and differential flows from various levels of the body of glass in the melting basin as production withdrawal rates from the working basin are progressively increased.

In any top-heated bath of molten silicates such as molten glass, several very important characteristics exist, which govern the performance of said molten mass when forces causing hydraulic flow are imposed upon it: (1) The temperature gradient, which may average 100 degrees F. per foot of depth downwardly from the surface. (2) The relationship of temperature to viscosity, which is the reciprocal of the mobility of the molten glass. (3) The relationship of temperature to the density of the molten glass, which, having the characteristics of a true liquid, will normally tend to dispose itself such that there is a uniform density gradient from top to bottom of the bath, with the glass of least density being at the surface of said bath.

I have discovered that up to a critical amount of production withdrawal, for given conditions of throat area; temperature gradient; density gradient; depth of bath with relation to throat lintel immersion; temperature at bath surface; glass composition; throat aperture profile and area; molten glass will be able to move directly into the throat aperture from strata which are not located above the level of said throat aperture lintel.

Such movement and flow of molten glass into said throat will hereinafter be designated as "normal" flow.

When the said critical amount of production withdrawal, which is of the order of 2500 poise-inches per minute, at throat lintel level, is exceeded, it is by virtue of, and is actuated by, an increase in the hydraulic head differential at and between the surface levels of the molten glass in the melting and working basins of the furnace. The notation 2500 poise-inches per minute takes into account the viscosity of the molten glass in poises and the rate at which it is being moved through a throat aperture. It has been determined by experiments of the present inventor that the value of 2500 poise-inches per minute is very useful in designing the cross-sectional area of throat aperture required to assure the above defined normal flow to the throat apertures of the furnace of the present invention. In other words, if the total throat aperture cross-sectional area is such that the maximum value of the flow at throat lintel level will not exceed 2500 poise-inches per minute, abnormal flow at the throat will not occur. Throat dimensions according to the above may be calculated in the following manner:

(1) Glass temperature at throat lintel level—A degrees F.
(2) Viscosity of glass at throat lintel level—B poises.
(3) Maximum withdrawal or production rate—C pounds per minute.
(4) Density of glass at level of mean throat height—D pounds per cubic inch.
(5) Mean throat flow rate—C/D, or E cubic inches per minute.
(6) Temperature gradient—F degrees F. per vertical inch.
(7) Glass temperature at bottom of throat aperture: A−(F×6 inches throat aperture height)—G degrees F.
(8) Viscosity of glass at G degrees F.—H poises.
(9) Ratio of throat aperture viscosities and thus of top throat stratum to bottom throat stratum velocities—H/B, or I.
(10) Maximum allowable velocity of top stratum at throat aperture—2500/B, or J inches per minute.
(11) Mean permissible velocity at throat aperture—((J/I) plus J)/2, or K inches per minute.
(12) Mean throat velocity required by item (5) in a throat 6 inches high and of unit width of 1 inch—E/6 square inches, or L inches per minute.
(13) Throat width required—(L/K)×1 inch, or M inches.

Said hydraulic head differential is subject to automatic increase with increase of production withdrawal to any amount sufficient to provide the energy necessary to the maintenance of the requisite flow through the throat passage of molten glass to sustain the rate of production withdrawal, in view of the various resistances to flow imposed upon it.

The bath of molten glass in the melting basin with which the throat aperture connects possesses two primary characteristics. Its density from top to bottom may vary on the order of less than 2 percent, while its viscosity from top to bottom may vary on the order of 1000 percent, for ordinary sodalime glasses.

In accordance with the law of conservation of energy, therefore, the available hydraulic flow head, as production withdrawal rates increase, acts to overcome density differences to a much greater degree than viscosity differences in causing the requisite rate of flow to satisfy production withdrawal rates, when the latter are increased beyond the above-described requirements for normal flow rate into the throat aperture.

This can only result in the fact that less dense glass, from strata above the level of the throat lintel, is forced by the hydraulic flow head, to plunge downwardly below the level at which such strata would normally be located in the furnace, and to enter the throat aperture; rather than said hydraulic flow head acting exclusively to accelerate the flow of the lower, more viscous strata at and below throat lintel level to a degree sufficient to satisfy said increased production rates.

This action is extremely sensitive in the transition zone from throat lintel to glass surface strata, and to illustrate its sensitivity, an increase in the hydraulic head of the order of only 3/32 inch, in a typical case, is adequate to cause hot, top strata glass to plunge downwardly below its normal level to the level of a throat lintel located 24 inches below glass level, on a density differential basis.

Having reached such a rate of production withdrawal, it will be clear that any further increase will inevitably result in acceleration toward the throat, in a horizontal direction, of the topmost seed-bearing strata in the furnace, which acceleration will in turn, cause exaggerated stream-flow patterns, typical of the surface flow of viscous liquids, to develop in these otherwise relatively quiescent strata, leading toward the downflow to the throat thus greatly reducing the time available for said topmost strata of glass to rid itself of seed.

Seedy glass will thus be caused to plunge downwardly through the throat, and will enter the working basin, where, being hotter than the other glass therein, it will seek the surface.

Surface temperatures in the working basin being normally insufficient to cause bursting of said seed at requisite rates, seedy glass will progress to the forming operations and seeds will appear in the product.

When this condition is reached, for any given thermal regime in the furnace, a further relatively slight increase in production rate will result in the quantity of seeds in the product increasing to an intolerable amount, thus limiting the production of the furnace, unless furnace temperatures can safely be still further increased.

It should be borne in mind that this flow of seedy glass is from the hottest stratum in the furnace, and thus, lying directly against the throat lintel, as dictated by its lower density, acts in a most active manner toward the destruction of the throat lintel.

Moreover, having the lowest viscosity of any glass in the furnace, and moving at a speed in inverse proportion to its viscosity, such glass from the hottest stratum must move in the order of 10 times the mean velocity of the glass in strata level with and below the level of the throat lintel.

Though the velocity of said plunging flow of said hot upper-strata glass when entering the throat aperture, relative to the mean velocity of the lower strata of glass which lie at and below the level of the throat lintel, is determined by its viscosity, relative to the mean viscosity of said lower strata, the thickness of said flow of upper-strata glass depends upon the amount of glass which it contributes to that part of the total furnace production which has exceeded the above mentioned normal production rate.

In view of its relatively high velocity in making said contribution, its thickness will necessarily be very much less than the thickness of the lower strata in the throat which it replaces, thus effecting little change in the quantity of glass supplied by said lower strata. Indeed, the increase in hydraulic flow head which caused said downward plunging of top-strata glass, will also have its effect in accelerating the movement of lower throat strata, so that the net result of the intrusion of said hot upper-strata glass may be neglected insofar as the continued contribution of lower-strata glass to production is concerned.

Computation indicates that the mean contribution to production tonnage by said strata at and below throat lintel level is, for example, 100 percent at a production rate of 90 tons per day in a given case, and is therefore still 75 percent when production has been increased to 120 tons per day.

From the foregoing, it may easily be deduced and asserted that by increasing total throat area by 2 or 3 times, the total capacity for flow through such increased throat area will be increased 2 or 3 times before the aforesaid normal rates of flow are exceeded, provided said increased area can be maintained equally active relative to the separate throats.

I have further discovered that the differential thermal losses from throat structures may be ascertained and compensated for in such manner that dual or multiple throats may be caused to maintain over-all thermal balances, in relative equality, and thus to remain equally active in passing molten glass, and have devised suitable and adequate means to accomplish these purposes, in a practical and workable manner.

I have, moreover, discovered that said differential heat losses relative to two or more throats may be compensated either by selectively applying electrical energy to the glass in said throats, or by selectively applying any form of thermal energy to the outside of throat structures, to oppose and nullify said differential heat losses.

When two or more throat structures are employed, it will be clear that their tops, bottoms and adjacent sidewalls will tend to lose heat in relatively equal amounts, but that the two exposed sides of the structures will be subject to greater heat losses, which latter may also be unequal, one as compared with the other, due to such influences as prevailing winds or unequal air movements.

The use of thermal insulation is practical at the bottoms of such structures and is frequently resorted to, to minimize heat losses.

On the other hand, thermal insulation applied at said exposed throat sidewalls can only retard, but cannot prevent the progress of differential heat losses and consequent relative throat stagnation, inasmuch as said insulation can never be 100 percent efficient.

Therefore, in order to be able completely to offset, or even to reverse the flow of heat through said throat sidewalls, I apply the principle of "opposed heat," preferably radiant in character, to said throat sidewalls. This may be accomplished by employing any suitable heat source of adequate capacity such as electric resistors, incandescent lamps, or fuel-fired burners designed to convert a high proportion of the thermal energy of the fuel into emissive radiant energy.

In applying the principle of opposed heat, I do not desire to be limited to predominantly radiant heat sources, but have selected the application of fuel-fired radiant burners for description herein as being most practical and applicable.

At the temperatures involved, thermal losses by radiation greatly exceed those due to natural convection by air currents, but both are present to a substantial degree, and both may completely be offset and even be reversed in their effect upon thermal losses from the glass within a throat, by use of an adequate amount of opposed heat or by opposed thermal radiation, as described hereinafter.

It will now be clear that, in addition to providing increased furnace production, the use of my method will also greatly reduce throat wear, thus prolonging useful furnace life; permit substantial reduction of fuel consumption and furnace temperature, to the same purpose; improve quality of ware produced by improving distribution of glass moving into the working basin at more than one location, thus eliminating dead corners in said working basin wherein the glass may stagnate and devitrify; substantially reduce overall production and repair costs.

The attached drawings will first illustrate my invention as applied to direct electrical heating of the glass within throat passages and latterly will illustrate said invention as applied to the external heating of portions of throat structures.

Further objects and advantages of the present invention will be apparent from the following description, reference being had to the accompanying drawings wherein preferred forms of embodiments of the invention are clearly shown.

Figure 1:
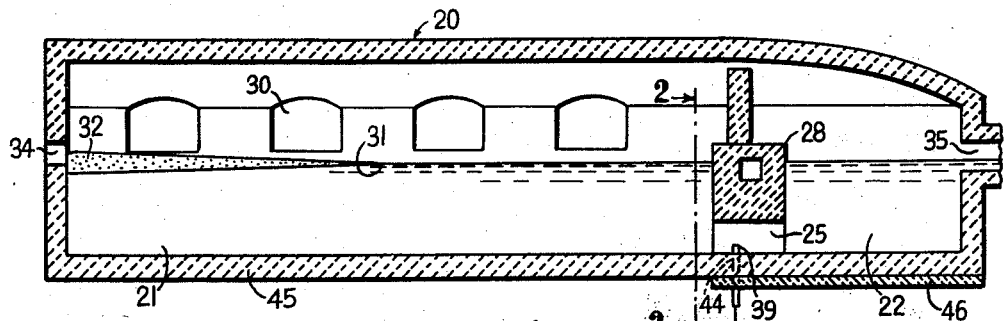
Figure 1 is a side sectional view of a glass melting furnace constructed according to the present invention. The section is taken along a vertical plane through the longitudinal center line of the furnace.
Figure 2:
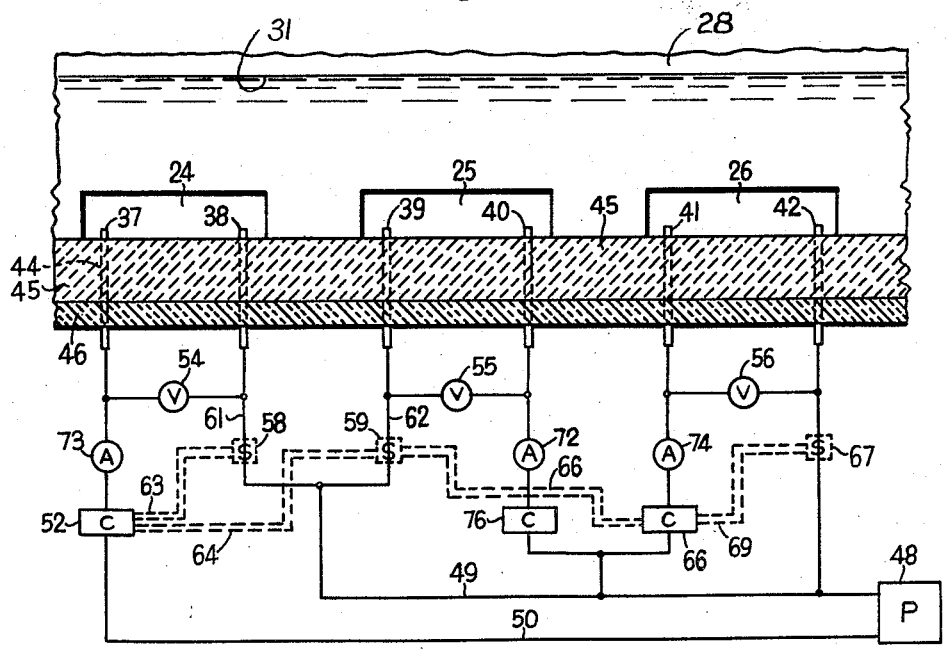
Figure 2 is a partial sectional view of the furnace of Figure 1 with the section being taken along line 2—2 of Figure 1.

Referring to the drawings Figure 1 illustrates a side sectional view of a glass melting furnace indicated generally at 20. Furnace 20 includes a melting basin 21 and a working basin 22 connected by a plurality of throats or submerged passages 24, 25, and 26 as seen in Figure 2. The throats serve to convey three separate flows of molten silicates such as glass through a bridge wall 28 separating the melting basin from the working basin.

The furnace is fired at a plurality of ports 30 in the sidewalls above the glass level 31. Raw materials or batch 32 are introduced at 34 by a conventional batch charger, not illustrated, and molten glass is withdraw at feeder channels one of which is illustrated at 35. The continuous withdrawal of glass at 35 produces a differential in static head between the working basin 22 and melting basin 21 which differential causes the glass to flow through throats 24, 25, and 26.

Referring to Figure 2, each of the throats 24, 25, and 26 includes heating means in the form of electrodes 37, 38, 39, 40, 41, and 42 which are extended through holes 44 through furnace bottom 45 and insulation 46.

As seen in Figure 2, each of the pairs of electrodes is connected to a source of electrical energy 48 by wires 49 and 50. The molten glass, being a conductor, completes the circuit and the temperature of the flow of molten glass between the electrodes is increased by resistance heating or Joule effect.

Referring to the left outer throat of Figure 2, a controller 52 is provided for varying the rate of electrical energy passing to electrodes 37 and 38. Controller 52 can be of a manually operated type, such as a variable output transformer, whereby the operator can manually increase or decrease the heating effect according to comperative readings of the voltmeters 54 and 55. If fully automatic control is desired, controller 52 may be connected to a first senser 58 in the circuit of the left throat 24 and to a second senser 59 in the circuit of the intermediate throat 25 as represented by dashed delineation in Figure 2. Such an automatic control system may be provided by incorporating a saturable core reactor, not illustrated, in controller 52. Sensers 58 and 59 may be in the form of current transformers arranged to sense variations in current flow in lines 61 and 62. Signals detected at sensers 58 and 59 are sent through lines 63 and 64 to suitable amplifying means in controller 52 and the degree of saturation of the core of the reactor is varied according to variations in the amplified signal.

When the degree of saturation of the reactor core is increased, the current flowing in the main circuit, i. e. from power supply 48, line 50, electrode 37, electrode 38, lines 61 and 49, is increased. When the degree of saturation of the core of the reactor is decreased, the current flowing in such main circuit is decreased.

The right outer throat 26 of Figure 2 includes a controller 66 which may be of a manually operated type or it may be connected to sensers 59 and 67 by wires 68 and 69 if fully automatic operation is desired.

The intermediate throat 25 of Figure 2 is provided with electrodes 39 and 40 primarily for the purpose of detecting the electrical resistance of the flow of molten glass in such intermediate throat. Since the circuit to electrodes 39 and 40 is provided, the resistance of the glass flowing in the intermediate throat can be determined by reading voltmeter 55 and ammeter 72, or, where fully automatic control is desired, senser 59 can be incorporated in the circuit to electrodes 39 and 40 to provide means for the previously described controllers 52 and 66, of the outer throats, to sense variations in the flow characteristics of the intermediate throat 25. Since intermediate throat 25 is used as the datum or reference for ascertaining the magnitude of heating effect required at each of outer throats 24 and 26, an automatic controller is not required for the circuit to electrodes 39 and 40. To provide means for setting the small amount of control current supplied to the intermediate electrodes, a third controller 76 may be provided as illustrated in Figure 2.

As previously described herein, the two outer throats 24 and 26 inherently tend to become inactive and hence the circuit to electrodes 37 and 38 and the circuit to electrodes 41 and 42 must carry relatively high currents as compared to the intermediate or control circuit to intermediate throat 25.

In operation of the system of Figure 2, if one of the outer throats, say 24, carrying a flow of molten glass of lower temperature than the flow passing through intermediate throat 25, then comparative readings of voltmeters 54 and 55 and ammeters 72 and 73 will indicate such condition to the furnace operator since the colder glass flowing in outer throat 24 will have a higher electrical resistance. The resistance of each throat circuit can of course be readily calculated as the quotient of the voltage divided by the amperage. The operator can then manually operate controller 52 to increase the power and heating effect being delivered to the molten glass flowing in outer throat 24. The desired rate of power input to the flow in such outer throat can be determined by computing the electrical resistance in the manner just described. Hence it will be understood that the operator can maintain the flow rates of the outer throats 24 and 26 at some predetermined value sufficient to maintain them active, or, if desired, the flow rates of the outer throats can be maintained equal to the flow rate through intermediate throat 25.

When the system of Figure 2 is operated with fully automatic controls, and one of the outer throats, say 24, is at a temperature lower than a predetermined desired temperature for such throat, then sensers 58 and 59 will sense such condition and send an appropriate electrical signal through wires 63 and 64 to controller 52 which controller will increase the output of electrical energy to electrodes 37 and 38 in the manner previously described. When the temperature of throat 24 is raised to said predetermined desired value, sensers 58 and 59 will send an appropriate signal to controller 52 and the output of electrical energy to electrodes 37 and 38 will be automatically adjusted to maintain the flow of molten glass in throat 24 at said predetermined desired temperature.

It will be clear that when a furnace is constructed with only two instead of three throats, either one may become the "control throat," for manual or for automatic control, the one selected being that one whose electrical circuit resistance is the lower of the two.

If the above noted relationship tends to reverse itself, the controls may then be employed in the reverse manner.

Figure 3:
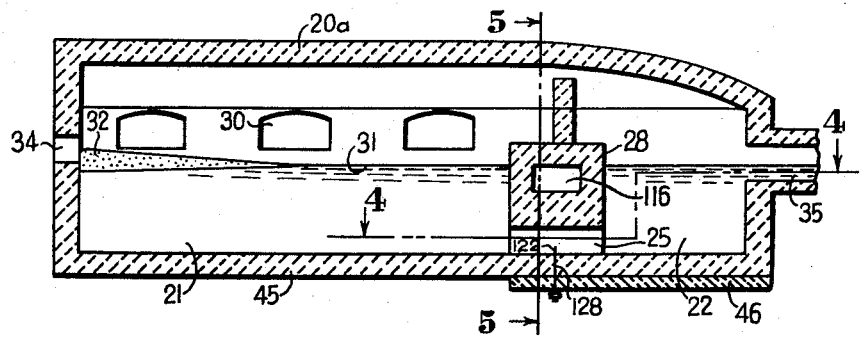
Figure 3 is a side sectional view of a second glass melting furnace constructed according to a second aspect of the present invention. The section is taken along a vertical plane through the longitudinal center line of the furnace.

Reference is next made to Figures 3 through 7 which illustrate a second system comprising a second aspect of the present invention. A glass melting furnace 20–a is illustrated in Figure 3 and the components thereof corresponding to identical components of previously described furnace 20 are designated by identical numerals.

Figure 4:
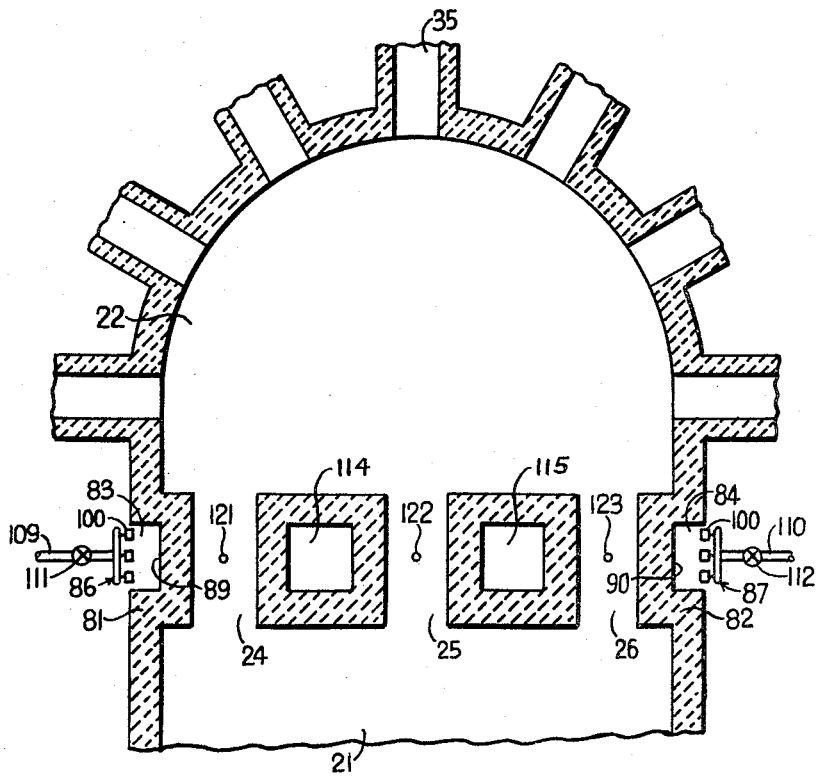
Figure 4 is a partial top sectional view of the furnace of Figure 3 with the section being taken along line 4—4 of Figure 3.
Figure 5:
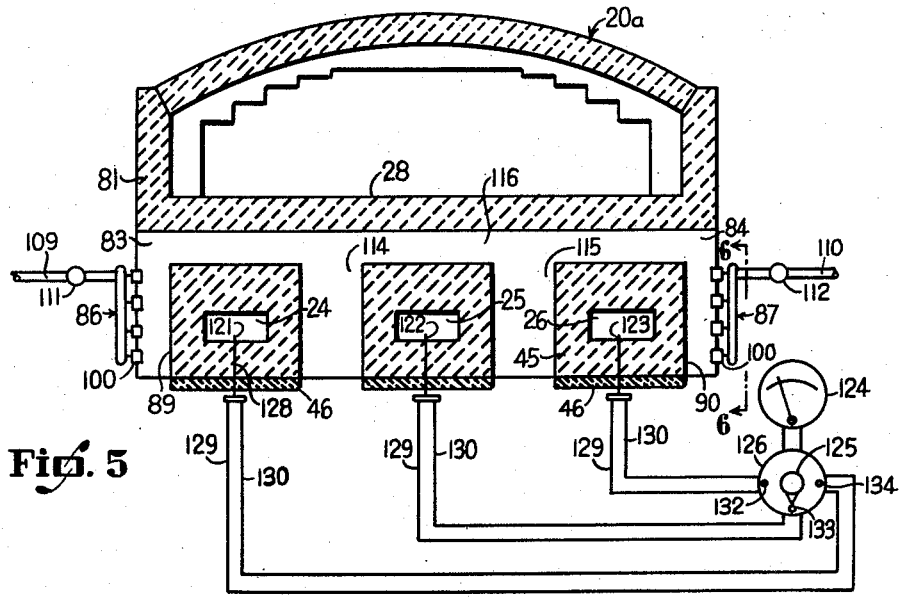
Figure 5 is an end view, partially in section, of the furnace of Figure 3 with the section being taken along line 5—5 of Figure 3.

As seen in Figures 4 and 5 each of the outside throat sidewalls 81 and 82 forms a recess at 83 and 84. A first heating means, indicated generally at 86, and a second heating means indicated generally at 87, are each located at one of the recesses 83 and 84 and arranged to apply heat to the outer sidewalls 89 and 90 of the outer throats 24 and 26, respectively.

Figure 6:
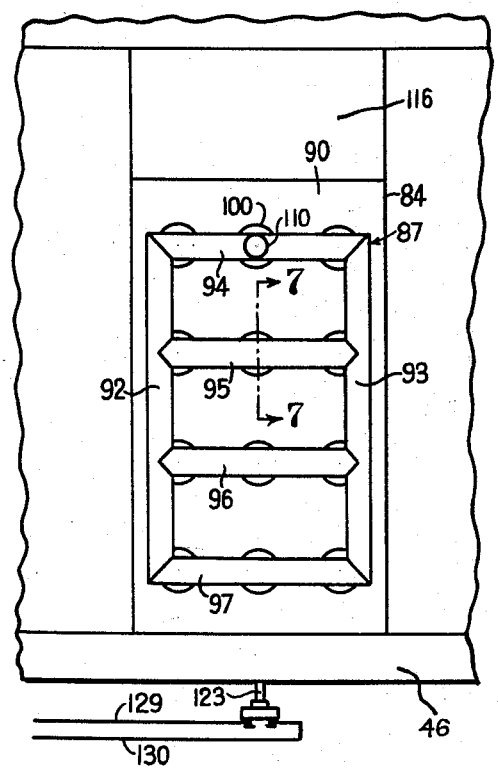
Figure 6 is a partial side elevational view of the furnace of Figure 3 with the section being taken along line 6—6 of Figure 5.
Figure 7:
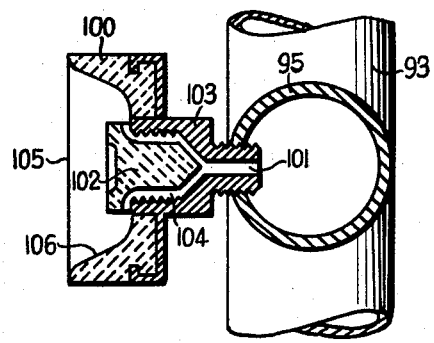
Figure 7 is a sectional view of a burner comprising a portion of the apparatus of Figure 6 with the section being taken along line 7—7 of Figure 6.

Referring to Figures 6 and 7 the heating means 86 and 87 may be provided by a burner assembly formed by a plurality of conduits 92, 93, 94, 95, 96, and 97 provided with a plurality of burners 100, which are preferably of the radiant type such as the radiant burner for gaseous fuel illustrated at 100 in Figure 7. Each of the burners 100 includes an intake passage 101 arranged to receive a mixture of fuel gas and air from the interior of a conduit 95. A refractory plug 102 is screwed into a housing portion 103 and a plurality of passages convey the mixture to a refractory cup portion 105. When the mixture is ignited the face 106 of refractory cup portion 105 becomes incandescent and radiant energy is emitted from such surface 106 against the sidewall 89 or 90 at the speed of light.

Premixed air and gaseous fuel are supplied to the burner assemblies 86 and 87 through conduits 109 and 110 leading from a source of such fuel, not illustrated, and valve means 111 and 112 are provided for controlling the flow of gaseous fuel to each of burner assemblies 86 and 87.

As is best seen in Figure 5, throats 24 and 25 are separated by a vertical air course 114 and throats 25 and 26 are separated by a second vertical air course 115, said two air courses being in communication with a horiozntal air course 116.

With continued reference to Figure 5, each of the throats 24, 25, and 26 is provided with a thermocouple 121, 122, and 123, erspectively, each of which is connectable with a temperature-graduated millivoltmeter 124 by manipulation of rotor 125 of a rotary switch 126. Each of the thermocouples 121, 122, and 123 may be extended through a hole as at 128 through throat passage bottom 45 and insulation 46 and is connected to rotary switch 126 by wires 129 and 130.

The function and operation of the system of Figures 3 through 7 is similar to that described in connection with the system of Figures 1 and 2 except that heat is supplied to the outer side walls 89 and 90 of the outer throats 24 and 26 by radiant energy from burners 100 instead of by Joule effect from electrodes immersed in the flow. When the temperature of one of the outer throats 24 or 26 is below a certain desired predetermined temperature such condition is determined from millivoltmeter 124 by rotating drum 125 of rotary switch 126 to one of the positions 132 or 134 to connect the appropriate thermocouple 121 or 123 with the millivoltmeter 124. The furnace operator then adjusts one of the valves 111 or 112 to increase the rate of fuel flowing to the appropriate heating means 86 or 87. When the thermocouple indicates the flow at the throat has increased in temperature to said predetermined desired value the furnace operator can readjust the valve 111 or 112 to maintain the flow at such temperature value.

The temperatures of the outer throats 24 and 26 can be balanced with the temperature of the intermediate throat 25 by setting the rotor 125 of rotary switch 126 to an intermediate position 133 whereby the temperature of the flow through intermediate throat 25 is indicated at millivoltmeter 124. The temperatures of each of the outer throats 24 and 26 can next be read and the valves 111 and 112 adjusted to increase or decrease the heating effect being applied to such outer throats by burner assemblies 86 and 87 until the flows through such outer throats are maintained at the same temperature as the flow through the intermediate throat.

It will be clear that if two instead of three throats are employed, the general arrangement of the heating means will be similar, that is, at the outer walls of each of the two throats, and the operating procedure will also be similar, such that fuel rates will be adjusted to cause the throat showing the lower temperature to bring its temperature up to equal that of the other throat.

While the forms of embodiments of the present invention as herein disclosed constitute preferred forms, it is to be understood that other forms might be adopted, all coming within the scope of the claims which follow.

I claim:

1. In a method of producing silicates characterized by producing a differential in static head between a melting basin and a working basin connected by a plurality of submerged passages, the steps of withdrawing molten silicates from said working basin to produce said differential in static head, supplying raw materials to said melting basin to replenish said molten silicates therein, and applying thermal energy to vary the temperature at certain of said submerged passages to alter the normal proportional distribution of flow through said passages established by the physical characteristics of said basins and passages.

2. The method of producing silicates which comprises producing molten silicates by melting, passing a plurality of flows of said molten silicates through a plurality of submerged throats, and applying thermal energy to vary the temperature of certain of said flows to control the relative rates of movement of said flows through said throats.

3. The method of producing silicates which comprises producing molten silicates by melting, passing a plurality of flows of said molten silicates through a plurality of submerged throats, and heating certain of said flows of molten silicates by Joule effect to control the relative rates of movement of said flows through said throats.

4. The method of producing silicates which comprises producing molten silicates by melting, passing a plurality of flows of said molten silicates through a plurality of submerged throats, and heating certain of said flows by applying thermal energy to the confines thereof to control the relative rates of movement of said flows through said throats.

5. The method of producing silicates which comprises producing molten silicates by melting, passing a plurality of flows of said molten silicates through a plurality of submerged throats, detecting a certain characteristic of certain of said flows, detecting a certain characteristic of certain other of said flows, and applying thermal energy to vary the temperature of certain of said flows to effect a certain relation between said characteristic of said certain of said flows and said characteristic of said certain other of said flows.

6. The method of producing silicates which comprises producing molten silicates by melting, passing a plurality of flows of said molten silicates through a plurality of submerged throats, detecting the temperature of certain of said flows, detecting the temperature of certain other of said flows, and applying thermal energy to vary the temperature of certain of said flows to maintain a certain relation between the temperature of said certain of said flows and the temperature of said certain other of said flows.

7. The method of producing silicates which comprises producing molten silicates by melting, passing a plurality of flows of said molten silicates through a plurality of submerged throats, detecting the temperature of certain of said flows, detecting the temperature of certain other of said flows, and heating certain of said flows of molten silicates by Joule effect to maintain a certain relation between the temperature of said certain of said flows and the temperature of said certain other of said flows.

8. The method of producing silicates which comprises producing molten silicates by melting, passing a plurality of flows of said molten silicates through a plurality of submerged throats, detecting the temperature of certain of said flows, detecting the temperature of certain other of said flows, and heating certain of said flows by applying thermal energy to the confines thereof to maintain a certain relation between the temperature of said certain of said flows and the temperature of said certain other of said flows.

9. The method of producing silicates which comprises producing molten silicates by melting, passing a plurality of flows of said molten silicates through a plurality of submerged throats, detecting the electrical resistance of certain of said flows, detecting the electrical resistance of certain other of said flows, and heating certain of said flows of molten silicates by Joule effect to effect a certain relation between the electrical resistance of said certain of said flows and the electrical resistance of said certain other of said flows.

10. The method of producing silicates which comprises producing molten silicates by melting, passing molten silicates through three throats spaced laterally relative to the direction of movement of said silicates to produce two outer and one intermediate flows separated one from the other, and applying thermal energy to the outer of said flows to heat said outer flow and thereby maintain the rates of movement thereof at certain rates.

11. The method of producing silicates which comprises producing molten silicates by melting, passing molten silicates through three throats spaced laterally relative to the direction of movement of said silicates to produce two outer and one intermediate flows separated one from the other, and applying thermal energy to the sides of the confines of the outer of said flows to heat said outer flows and thereby maintain the rates of movement thereof at certain rates.

12. A furnace for producing molten silicates comprising containing means for said molten silicates, said containing means communicating with a plurality of submerged passages for receiving a plurality of flows of molten silicates from said containing means; a source of thermal energy for applying heat to certain of said flows; and means for applying said heat differentially to said certain of said flows to produce a desired distribution of flow in said plurality of passages.

13. A furnace for producing molten silicates comprising containing means for said molten silicates, said containing means communicating with a plurality of submerged passages for receiving a plurality of flows of molten silicates from said containing means; a source of thermal energy for applying heat to certain of said flows; and control means for varying the rate of application of said thermal energy from said source to said certain of said flows, said variation in heat application being applied differentially to said certain of said flows to produce a desired distribution of flow in said plurality of passages.

14. A furnace for producing molten silicates comprising containing means for said molten silicates, said containing means communicating with a plurality of submerged passages for receiving a plurality of flows of molten silicates from said containing means; a source of thermal energy for applying heat to certain of said flows; detector means for determining a characteristic of certain of said flows; and control means connected to said detector means for varying the rate of application of said thermal energy responsive to variations in said detected characteristics.

15. A furnace for producing molten silicates comprising containing means for said molten silicates, said containing means communicating with a plurality of submerged passages for receiving a plurality of flows of molten silicates from said containing means; electrode means in contact with the molten silicates of certain of said flows for heating same by Joule effect; a source of electrical energy for said electrode means; and control means for the flow of electrical energy from said source to said electrode means for applying said electrical energy differentially to said certain of said plurality of flows to produce a desired distribution of flow in said plurality of passages.

16. A furnace for producing molten silicates comprising containing means for said molten silicates, said containing means communicating with a plurality of submerged passages for receiving a plurality of flows of molten silicates from said containing means; a first electrode means in contact with the molten silicates of certain of said flows; a second electrode means in contact with the molten silicates of certain other of said flows; a source of electrical energy for said electrode means whereby heat is applied to certain of said flows by Joule effect; detector means for sensing the rate of flow of electric current to one of said electrode means; and control means for the flow of electrical energy from said source to the other of said electrode means.

17. Mechanism defined in claim 16 characterized by means for operating said control means responsive to variations in said rate of flow of electric current sensed by said detector means.

18. A furnace for producing molten silicates comprising containing means for said molten silicates, said containing means communicating with a plurality of submerged passages for receiving a plurality of flows of molten silicates from said containing means; a heating means for applying thermal energy to the confines of certain of said flows of molten silicates; a source of energy for said heating means; and control means for varying the rate of flow of energy from said source to said heating means to apply said energy differentially to said certain of said flows to produce a desired distribution of flow in said plurality of passages.

19. A furnace for producing molten silicates comprising containing means for said molten silicates, said containing means communicating with a plurality of submerged passages for receiving a plurality of flows of molten silicates from said containing means; a heating means for applying thermal energy to the confines of certain of said flows of molten silicates; a source of energy for said heating means; control means for varying the rate of flow of energy from said source to said heating means; and detector means for sensing a characteristic of certain other of said flows.

20. A furnace for producing molten silicates comprising containing means for said molten silicates, said containing means communicating with at least three submerged passages for conducting at least three flows of molten silicates from said containing means, said submerged passages being laterally spaced relative to the direction of movement of said flows to form two outer and certain intermediate passage means; a first heating means for applying thermal energy to the flow at one of said outer passage means; a second heating means for applying thermal energy to the flow at the other of said outer passage means; means forming a source of energy for each of said heating means; and control means for varying the rate of flow of energy from said source to said heating means.

21. Mechanism defined in claim 19 characterized by each of said heating means comprising a heating element disposed along the outer side of a respective outer passage means.

22. A furnace for producing molten silicates comprising containing means for said molten silicates, said containing means communicating with a plurality of submerged passages for receiving a plurality of flows of molten silicates from said containing means; and means for selectively varying the operating temperature of certain of said plurality of flows to produce a desired distribution of flow in said plurality of passages.

23. A furnace for producing molten silicates comprising containing means for said molten silicates, said containing means communicating with a plurality of submerged passages for receiving a plurality of flows of molten silicates from said containing means; means for varying the operating temperature of certain of said flows; and control means for said means for varying said operating temperature to apply said variations selectively to said certain of said flows to produce a desired distribution of flow in said plurality of passages.

24. A furnace for producing molten silicates comprising containing means for said molten silicates, said containing means communicating with a plurality of submerged passages for receiving a plurality of flows of molten silicates from said containing means; a source of thermal energy for applying heat to certain of said flows; and means for applying said heat selectively to said certain of said flows to produce a desired distribution of flow in said plurality of passages.

25. A furnace for producing molten silicates comprising containing means for said molten silicates, said containing means communicating with a plurality of submerged passages for receiving a plurality of flows of molten silicates from said containing means; a source of thermal energy for applying heat to certain of said flows; and control means for varying the rate of application of said thermal energy from said source to said certain of said flows, said variation in heat application being applied selectively to certain of said flows to produce a desired distribution of flow in said plurality of passages.

26. A furnace for producing molten silicates comprising containing means for said molten silicates, said containing means communicating with a plurality of submerged passages for receiving a plurality of flows of molten silicates from said containing means; electrode means in contact with the molten silicates of certain of said flows for heating same by Joule effect, a source of electrical energy for said electrode means; and control means for the flow of electrical energy from said source to said electrode means for applying said electrical energy selectively to said certain of said plurality of flows to produce a desired distribution of flow in said plurality of passages.

27. A furnace for producing molten silicates comprising containing means for said molten silicates, said containing means communicating with a plurality of submerged passages for receiving a plurality of flows of molten silicates from said containing means; means for varying the operating temperature of certain of said flows; detector means for determining a characteristic of certain of said flows; and control means connected to said detector means and to said means for varying said operating temperature to effect said variations responsive to variations in said detected characteristic.

28. The method of producing silicates which comprises producing molten silicates by melting, passing a plurality of flows of said molten silicates through a plurality of submerged throats, and selectively varying the temperature of certain of said flows to control the relative rates of movement of said flows through said throats.

29. The method of producing silicates which comprises producing molten silicates by melting, passing a plurality of flows of molten silicates through a plurality of submerged passages, and varying the temperatures of certain of said plurality of flows to produce a desired distribution of flow in said plurality of passages.

References Cited in the file of this patent

UNITED STATES PATENTS

| | | |
|---|---|---|
| 1,639,657 | Mantle | Aug. 23, 1927 |
| 1,944,855 | Wadman | Jan. 23, 1934 |
| 2,081,595 | McIntosh | May 25, 1937 |
| 2,098,625 | Honiss | Nov. 9, 1937 |
| 2,512,761 | Arbeit | June 27, 1950 |
| 2,691,689 | Arbeit et al. | Oct. 12, 1954 |
| 2,707,717 | Seymour | May 3, 1955 |

FOREIGN PATENTS

| | | |
|---|---|---|
| 476,744 | Germany | May 23, 1929 |
| 802,944 | Germany | Feb. 26, 1951 |